United States Patent
Takeuchi et al.

(10) Patent No.: US 9,960,653 B2
(45) Date of Patent: May 1, 2018

(54) DRIVING DEVICE HAVING SEALING MEMBER WITH FIRST AND SECOND ANNULAR PROTRUSIONS

(71) Applicant: DENSO CORPORATION, Kariya, Aichi-pref. (JP)

(72) Inventors: Shun Takeuchi, Kariya (JP); Koji Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/407,106

(22) Filed: Jan. 16, 2017

(65) Prior Publication Data
US 2017/0244296 A1   Aug. 24, 2017

(30) Foreign Application Priority Data
Feb. 18, 2016 (JP) .................................. 2016-28641

(51) Int. Cl.
| | |
|---|---|
| H02K 5/10 | (2006.01) |
| H02K 5/22 | (2006.01) |
| H02K 11/00 | (2016.01) |
| H02K 11/215 | (2016.01) |
| H02K 11/30 | (2016.01) |
| H02K 5/04 | (2006.01) |
| H02K 11/33 | (2016.01) |
| B62D 5/04 | (2006.01) |

(52) U.S. Cl.
CPC .................. *H02K 5/10* (2013.01); *H02K 5/04* (2013.01); *H02K 5/225* (2013.01); *H02K 11/215* (2016.01); *H02K 11/30* (2016.01); *H02K 11/33* (2016.01); *B62D 5/0406* (2013.01); *H02K 2213/03* (2013.01)

(58) Field of Classification Search
CPC ...................... H02K 3/50; H02K 3/505; H02K 3/52–3/5258; H02K 5/128; H02K 5/132; H02K 11/00–11/40
USPC ............................ 310/71, 87–89, 68 A–68 R
See application file for complete search history.

(56) References Cited

U.S. PATENT DOCUMENTS

| | | | | |
|---|---|---|---|---|
| 3,604,964 A | * | 9/1971 | Conrad ................ | H02K 5/1285 310/68 R |
| 2014/0125173 A1 | * | 5/2014 | Hayashi ................ | H02K 3/522 310/88 |
| 2015/0222156 A1 | * | 8/2015 | Tomizawa ............. | H02K 5/225 310/88 |
| 2016/0336831 A1 | * | 11/2016 | Horizumi ................ | H02K 5/10 |

FOREIGN PATENT DOCUMENTS

JP    H11-89156 A    3/1999

* cited by examiner

*Primary Examiner* — Thomas Truong

(57) ABSTRACT

The present disclosure provides a driving device including a stator, a rotor, a housing, a controller, and a sealing member. The sealing member includes a base and protrusions. The protrusion includes a cylindrical portion, a cover portion, a first annular protrusion, and a second annular protrusion. The first and second annular protrusions outwardly protrude from the cylindrical portion. The first annular protrusion is fit in a fit region of the lead hole in a compressed state. The second annular protrusion is offset from the fit region toward the controller.

7 Claims, 9 Drawing Sheets

DRIVING DEVICE HAVING SEALING MEMBER WITH FIRST AND SECOND ANNULAR PROTRUSIONS

CROSS REFERENCE TO RELATED APPLICATION

This application is based on reference Japanese Patent Application No. 2016-028641 filed on Feb. 18, 2016, the disclosure of which is incorporated herein by reference.

TECHNICAL FIELD

The present disclosure relates to a driving device having a motor and a controller.

BACKGROUND

A driving device conventionally has a motor and a controller for controlling the motor, which are integrally disposed in the driving device. In such a driving device, a housing of a motor defines holes (hereinafter, referred to as "lead holes") into which leads extending from a coil of the motor to the controller are inserted. When the lead holes extend through the housing between an inside and an outside of the housing, foreign substances may be allowed to enter into the housing through the lead holes.

To address this concern, JP 2015-144507 A discloses a driving device including a sealing member to close the lead holes. The sealing member includes a base inside the housing and a plurality of protrusions protruding from the base into the lead holes. The protrusion includes a cylindrical portion in which the lead is loosely fitted and a cover portion that is disposed in one end of the cylindrical portion such that the lead is in tightly contact with the cover portion. The base is held between a bottom of a cylindrical case, which forms the housing, and a frame end. According to the sealing member, since there is a space between an outer circumferential side and an inner circumferential side of the cylindrical portion, the cylindrical portion is allowed to be flexed. Therefore, even if the lead slightly moves inside the lead hole, the cover portion can be prevented from being deformed because of the flexibility of the cylindrical portion.

In the above patent document, the sealing member is held in the axial direction. Thus, the housing needs to have a holder formed of the bottom of the case and the frame end, which are arranged in the axial direction. As a result, the configuration of the housing may be complicated.

In view of the above, it is an objective of the present disclosure to provide a driving device that is capable of suppressing deterioration of sealing function against lead holes, while allowing leads to slightly move, and that is also capable of making the structure of a housing simple.

SUMMARY

An aspect of the present disclosure provides a driving device including a stator, a rotor, a housing, a controller, and a sealing member. The stator includes a coil having a plurality of leads. The rotor is disposed to be rotatable relative to the stator. The housing houses the stator and the rotor and defines a plurality of lead holes into which the plurality of leads are inserted. The controller is disposed outside of the housing, and the plurality of leads are connected to the controller. The sealing member includes a base, which is disposed in the housing between the plurality of lead holes and the coil, and a plurality of protrusions, which protrude from the base into the plurality of lead holes, the plurality of leads being inserted into the plurality of protrusions. Each of the plurality of protrusions includes a cylindrical portion, a cover portion, a first annular protrusion, and a second annular protrusion. The cover portion is disposed to cover an end of the cylindrical portion opposite to the base and to be in tightly contact with one of the plurality of leads. The first annular protrusion outwardly protrudes from the cylindrical portion between the base and the cover portion. The second annular protrusion outwardly protrudes from the cylindrical portion between the first annular protrusion and the cover portion.

A region of each of the plurality of lead holes is defined as a fit region in which the first annular protrusion and the second annular protrusion are able to fit in a compressed state. The first annular protrusion is fit in the fit region in the compressed state. The second annular protrusion is offset from the fit region toward the controller or is fit in the fit region in the compressed state.

According to the sealing member as described above, even if the lead slightly moves in the lead hole, the portion of the cylindrical portion between the first annular protrusion and the cover portion can be flexed. As a result, the cover portion is prevented from being deformed. The sealing member is in tightly contact with the inner wall of the fit region due to a compressed force of the first annular protrusion. Hence, the sealing member is held in the housing while closing the lead holes. Accordingly, even if only one wall exists between the coil and the controller, the sealing member can be provided. Thus, the driving device can suppress deterioration of sealing function against the lead holes while allowing the leads to move in the lead holes. Further, the structure of the housing can be simplified.

In a case where the second annular protrusion is offset from the fit region toward the controller, even if the sealing member is biased to move toward the coil, the sealing member is regulated from moving due to, in addition to the compressed force, interference between the second annular protrusion and the edge portion of the fit region. On the contrary, in a case where the second annular protrusion is fit in the fit region in the compressed state, even if the sealing member is biased to move toward the coil, the sealing member is regulated from moving due to the compressed force of the second annular protrusion in addition to the compressed force of the first annular protrusion.

The sealing member can be coupled to the housing by inserting the protrusions into the lead holes. Thus, assembling process of the sealing member can be easily automated.

The sealing member includes the plurality of protrusions and each protrusion is connected to each other through the base. Thus, there is no need to have a plurality of sealing member for the plurality of lead holes.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Next, a plurality of embodiments of the present disclosure will be described with reference to drawings. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Figure 1:
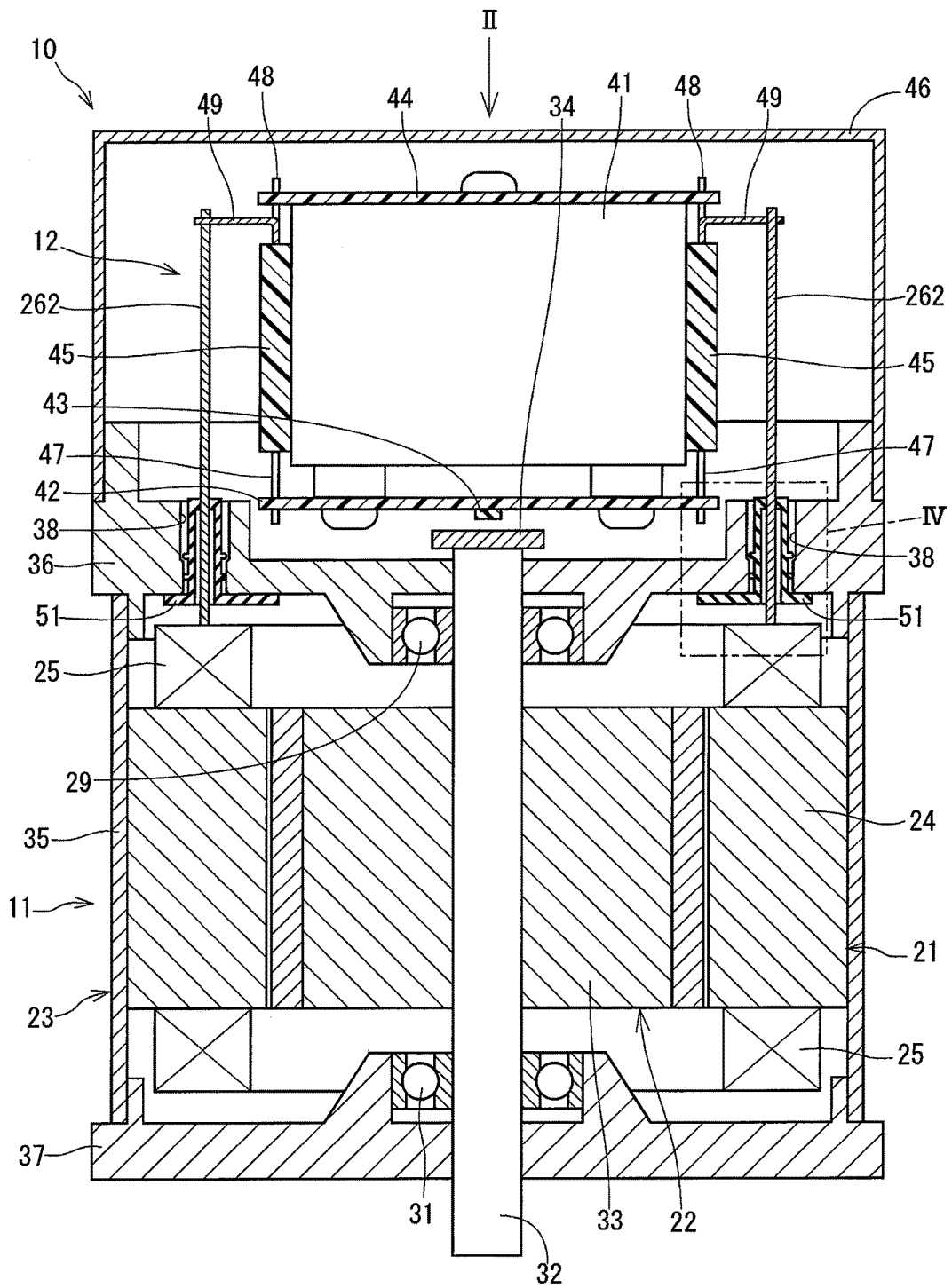
FIG. 1 is a cross-sectional view of a driving device according to a first embodiment taken along I-I line in FIG. 2.

FIG. 1 shows a driving device according to the first embodiment. The driving device 10 is used as a driving source for an electric power steering device that supports steering operation by a driver for a vehicle.

Figure 2:
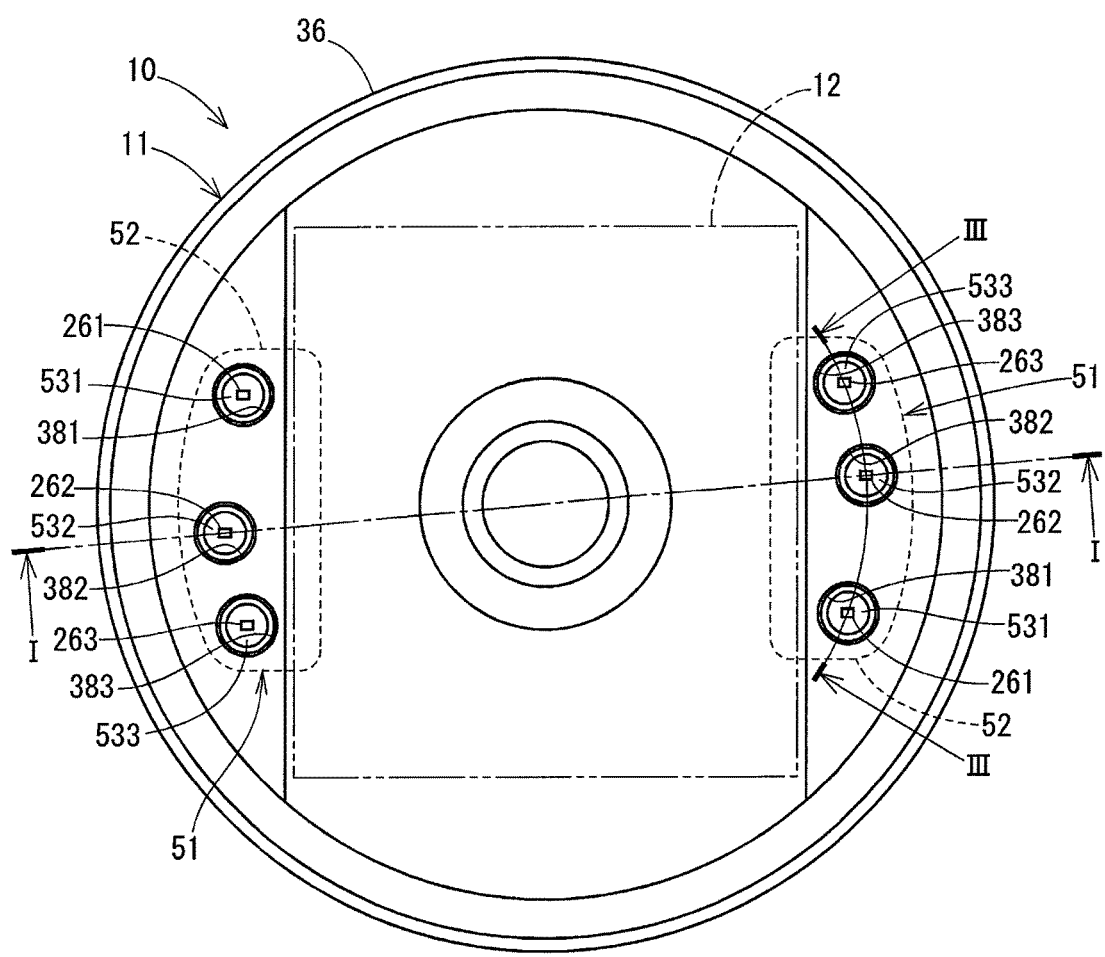
FIG. 2 is a diagram illustrating a motor and a sealing member when viewed along the arrow I-I in FIG. 1.
Figure 3:
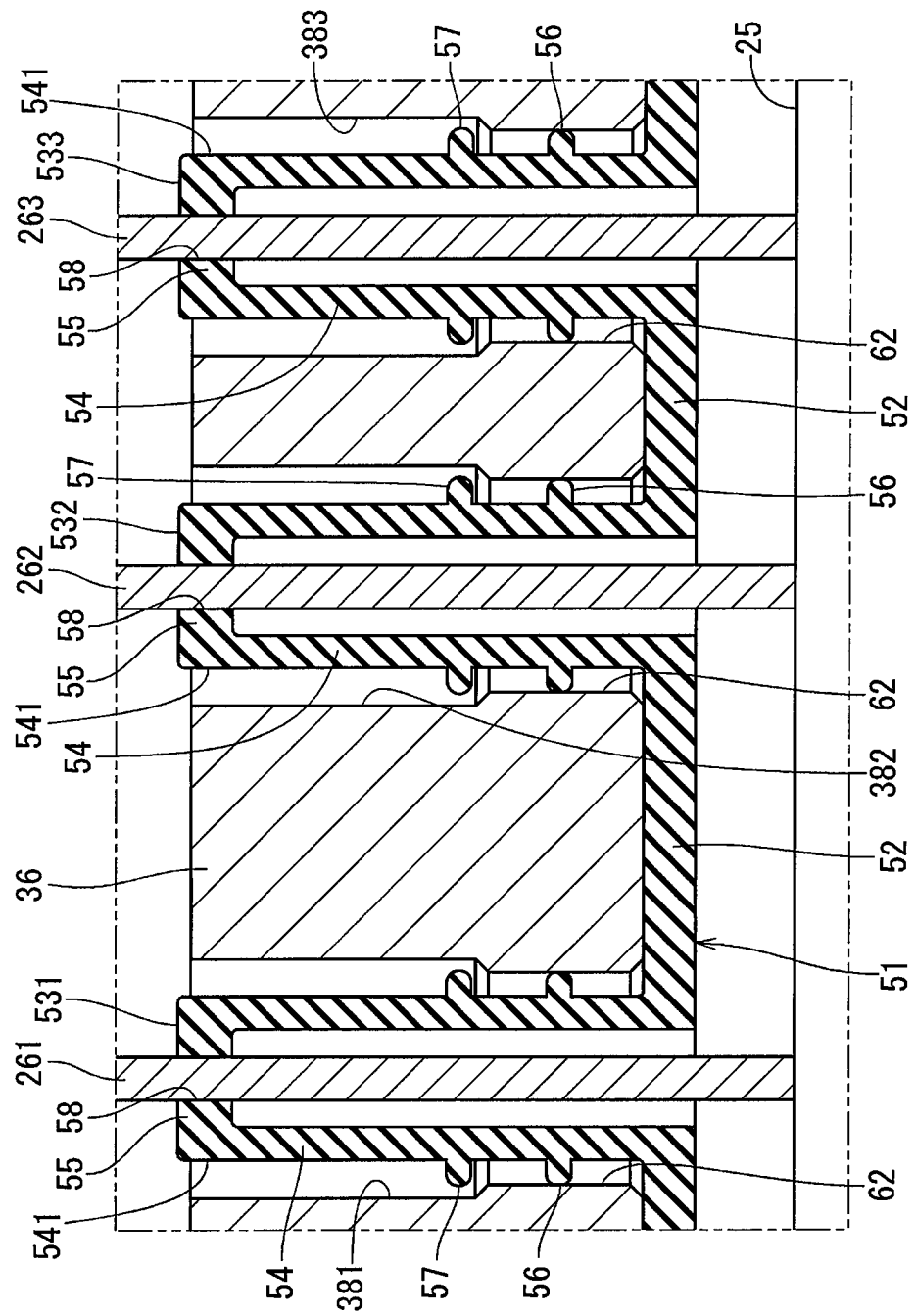
FIG. 3 is a cross-sectional view taken along III-III line in FIG. 2.

Initially, an entire configuration of the driving device 10 will be described with reference to FIGS. 1 and 2.

The driving device 10 is a mechatronical integration driving device where a motor 11 and a controller 12 to control the motor 11 are integrally provided.

The motor 11 is a three-phase brushless motor and includes a stator 21, a rotor 22, and a housing 23 accommodating the stator 21 and the rotor 22.

The stator 21 includes a stator core 24, a couple of two three-phase coils (hereinafter, merely referred to as "coils") 25 coupled to the stator core 24. Each of three leads 261, 262, 263 extends in an axial direction from a respective one of phase windings that forms the coil 25. Hereinafter, the leads 261, 262, 263 may be referred to as "leads 26" when not distinguishably referred.

The rotor 22 includes a rotational shaft 32 supported by two bearings 29, 31 and a rotor core 33 fit to the rotational shaft 32. The rotor 22 is relatively rotatable inside the stator 21. A detection target member 34 formed of a permanent magnet is disposed one end of the rotational shaft 32. The detection target member 34 is used when a rotational sensor 43 detects a rotational angle of the rotor 22.

The housing 23 includes a cylindrical case 35, a first frame end 36 disposed in one end of the case 35, and a second frame end 37 disposed in the other end of the case 35. The first frame end 36 and the second frame end 37 clamps the case 35 and are tightly connected to each other by a plurality of bolts (not shown). The bearing 29 is disposed in a center portion of the first frame end 36, whereas the bearing 31 is disposed in an center portion of the second frame end 37. The first frame end 36 defines a plurality of lead holes 381, 382, 383, into which the plurality of leads 26 are respectively inserted. Hereinafter, the plurality of lead holes 381, 382, 383 may be referred to as "lead holes 38" when not distinguishably referred. The number of the lead holes 38 is the same as the leads 26.

The controller 12 is disposed outside of the housing 23 and includes a heat sink 41, a control substrate 42, a rotational angle sensor 43, a power substrate 44, and a power module 45.

The heat sink 41 is disposed inside a cover member 46 and is fixed to the first frame end 36.

The control substrate 42 is disposed between the heat sink 41 and the first frame end 36. Electronic control components using relatively low power such as the rotational angle sensor 43, a microcomputer (not shown), and so on are mounted on the control substrate 42.

The rotational angle sensor 43 is disposed to face the detection target member 34 in the axial direction. The rotational angle sensor 43 detects a rotational angle of the rotor 22 based on a magnetic flux of the detection target member 34. The power substrate 44 is disposed on a side of the heat sink 41 opposite to the control substrate 42. Electronic power components using relatively high power such as a capacitor (not shown), a choke coil (not shown), and so on are mounted on the power substrate 44.

The module 45 includes switching elements (not shown) that switch energizing to each of the phase windings of the coil 25. In the present embodiment, two power modules 45 are disposed for the two coils 25, respectively. The two power modules 45 are positioned on both sides of the heat sink 41.

Each of the power modules 45 includes a control terminal 47, a power terminal 48, and a plurality of motor terminals 49, as protruding terminals protruding from a molding portion for molding the switching elements. The control terminal 47 is connected to the control substrate 42. The power terminal 48 is connected to the power substrate 44. The motor terminals 49 are connected to the leads 26.

The driving device 10 generates a rotational magnetic field by sequentially switching energizing to each phase winding of the coil 25 based on detection signals of the rotational angle sensor 43. Accordingly, the rotor 22 is rotated by a magnetic attraction stemming from the rotational magnetic field. The controller 12 of the driving device 10 is disposed on one side of the motor 11 in the axial direction. Therefore, the controller 12 can be prevented from directly receiving vibration from the motor 11. The first frame end 36 to which the controller 12 is fixed is formed of, e.g., aluminum die-casting and therefore is minutely manufactured. As a result, accuracy of the position of the controller 12 relative to the motor 11 is remarkably improved, and heat generated from the controller 12 can be effectively released.

Next, the structure of the driving device 10 will be described in detail with reference to FIGS. 1 to 4.

The driving device 10 further includes two sealing members 51. Each of the sealing members 51 is provided for a respective one of the coils 25.

Each of the seal members 51 includes a base 52, a protrusion 531, a protrusion 532, and a protrusion 533. The base 52 is disposed in the housing 23 between the lead holes 38 and the coils 25. The protrusion 531 is disposed for the lead hole 381. The protrusion 532 is disposed for the lead hole 382. The protrusion 533 is disposed for the lead hole 383. The sealing member 51 is assembled such that the base 52 is in contact with the first frame end 36. Hereinafter, the protrusions 531, 532, 533 may be referred to as "protrusions 53" when not distinguishably referred.

Each of the protrusions 53 protrudes into the respective lead hole 38 from the base 52. The lead 26 is inserted into the protrusion 53. More specifically, the protrusion 53 includes a cylindrical portion 54, a cover portion 55, a first annular protrusion 56, and a second annular protrusion 57. The cover portion 55 is disposed to cover an end of the cylindrical portion 54 opposite to the base 52 and to be in tightly contact with the lead 26. The first annular protrusion 56 outwardly protrudes from the cylindrical portion 54 between the base 52 and the cover portion 55. The second annular protrusion 57 outwardly protrudes from the cylindrical portion 54 between the first annular protrusion 56 and the cover portion 55. In this embodiment, the number of the second annular protrusion 57 is one. A gap is formed between an inner wall of the cylindrical portion 54 and the lead 26. The inner wall of the cylindrical portion 54 includes a portion of the cylindrical portion 54 radially inward of the first annular protrusion 56 and the second annular protrusion 57.

The cover portion 55 includes a through hole 58 into which the lead 26 is fit. A gap is formed between an outer wall of the cylindrical portion 54 and an inner wall of the lead hole 38. The outer wall of the cylindrical portion 54 includes a through hole outer wall 541 radially outward of the through hole 58. The inner radius of the through hole 58 of the cover portion 55 is less than the outer radius of the lead 26 when the cover portion 55 is not assembled. Thus, when the lead 26 is fit into the cover portion 55, the through hole 58 radially expands. As a result, the lead 26 is in tightly contact with the cover portion 66, thereby generating no space therebetween. A space between the cylindrical portion 54 and the lead 26 is sealed by the cover portion 55.

Each of the lead holes 38 includes a fit region 62 in which the first annular protrusion 56 and the second annular protrusion 57 are able to be fit in a compressed state. The "compressed state" can be generally defined as a state where a compressed member is pressed against an object member due to a restoring force of the compressed member to return back to an original state (i.e., a non-compressed state). It can be understood that "the first annular protrusion 56 and the second annular protrusion 57 are fit in a compressed state" means that the first annular protrusion 56 and the second annular protrusion 57, each of which is compressed in an inwardly radial direction, are fit in the fit region 62, while being pressed against the inner wall of the lead hole 38 by the restoring force thereof to return back in an outwardly radial direction. The fit region 62 has an inner radius less than another region of the lead hole 38. The first protrusion 56 is fit in the fit region 62 in the compressed state. A space between an inner wall of the lead hole 38 and the cylindrical portion 54 is sealed by the first annular protrusion 56. The second annular protrusion 57 is positioned within the lead hole 38 but is offset from the fit region 62 toward the controller 12.

Figure 4:
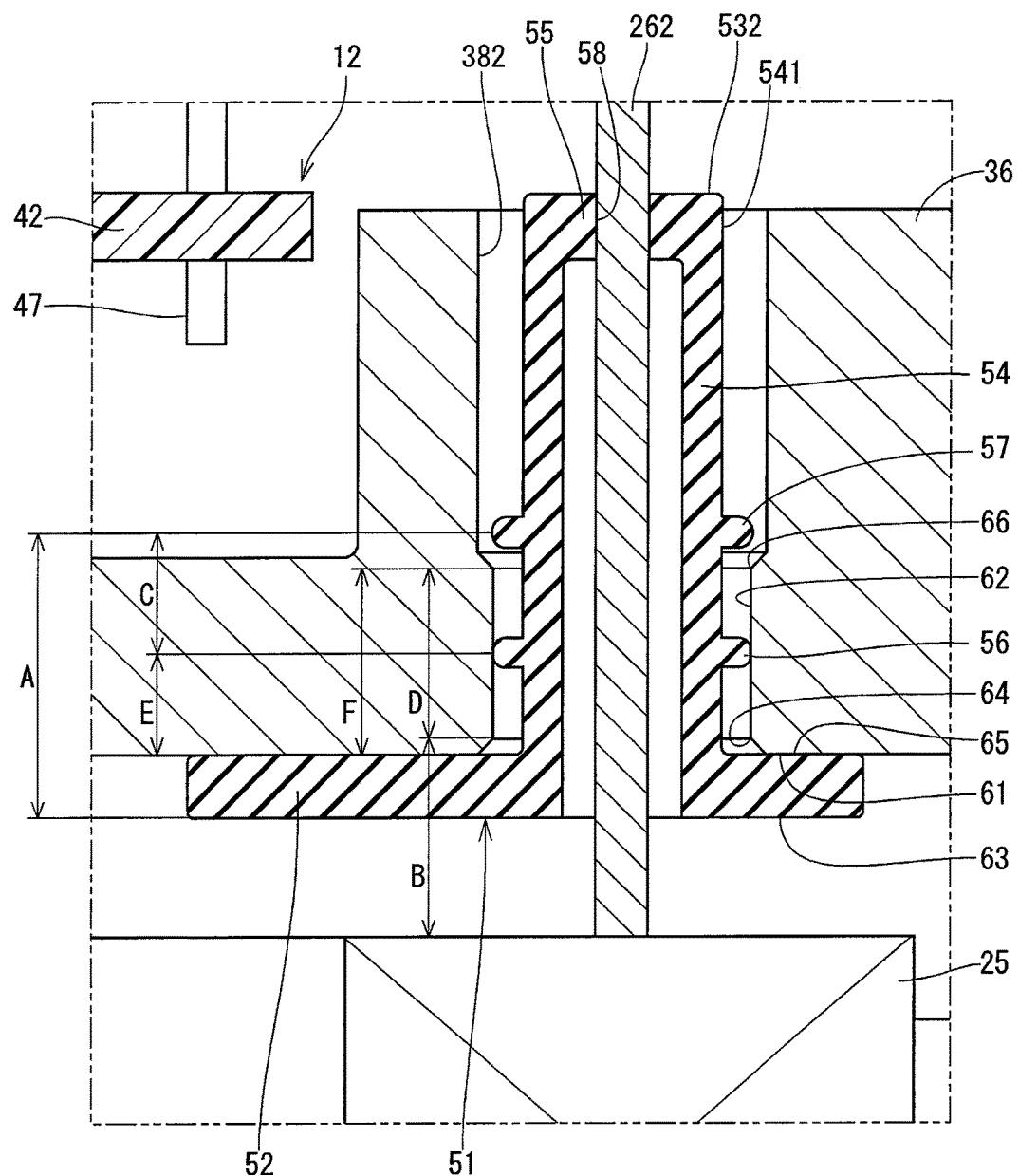
FIG. 4 is an enlarged view of a region indicated by IV in FIG. 1.

As shown in FIG. 4, the distance A between the second annular protrusion 57 and an end surface 63 of the sealing member 51 close to the coil 25 is greater than the distance B between an end surface of the coil 25 close to the lead hole 38 (i.e., a coil end) and an end portion 64 of the fit region 62 close to the coil 25. Further, the distance C between the first annular protrusion 56 and the second annular protrusion (a particular second annular protrusion) 57 is less than a length D of the fit region 62 along an insertion direction. Furthermore, the distance E between an end surface 65 of the base 52 close to the lead hole 38 and the first annular protrusion 56 is less than the distance F between an edge portion 61 of the lead hole 38 close to the coil 25 and an end portion 66 of the fit region 62 close to the controller 12. It should be noted that center positions of the annular second protrusion 57 and the first annular protrusion 56 along the axial direction of the cylindrical portion 54, i.e., the insertion direction of the fit region 62 are used when defining the distances A, C and E.

As described above, the driving device 10 according to the first embodiment includes the stator 21, the rotor 22, the housing 23, the controller 12, and the sealing member 51. The housing 23 includes the plurality of lead holes 38 into which the plurality of leads 26 are inserted respectively. The controller 12 is disposed outside of the housing 23 and the plurality of leads 26 are connected to the controller 12. The sealing member 51 includes the base 52, which is disposed in the housing 23 between the plurality of lead holes 38 and the coil 25, and a plurality of protrusions 53, which protrude from the base 52 into the plurality of lead holes 38. The plurality of leads 26 are inserted into the plurality of protrusions 53.

Each of the plurality of protrusions 53 includes the cylindrical portion 54, the cover portion 55, the first annular protrusion 56, and the second annular protrusion 57. The cover portion 55 is disposed to cover the end of the cylindrical portion 54 opposite to the base 54 and to be in tightly contact with one of the plurality of leads 26. The first annular protrusion 56 outwardly protrudes from the cylindrical portion 54 between the base 54 and the cover portion 55. The second annular protrusion 57 outwardly protrudes from the cylindrical portion 54 between the first annular protrusion 56 and the cover portion 55. The first annular protrusion 56 is fit in the fit region 62 in the compressed state. The second annular protrusion 57 is offset from the fit region 62 toward the controller 12.

With the above-described configuration of the sealing member 51, since the portion of the cylindrical portion 54 between the cover portion 55 and the first annular protrusion 56 is flexed even when the position of the lead 26 is shifted in the lead hole 38, the through hole 58 of the cover portion 55 can be prevented from being deformed. Since the sealing member 51 is in tightly contact with the inner wall of the fit region 62 due to the compressed force of the first annular protrusions 56, the sealing member 51 is held in the housing 23 while closing the lead holes 38. Therefore, even if only one wall exists between the coil 25 and the controller 12, the sealing member 51 can be provided. Thus, the driving device 10 can suppress deterioration of sealing performance against the lead holes 38 while allowing the leads 26 to slightly move. Further, the structure of the housing 23 can be simplified.

The second annular protrusion 57 is offset from the fit region 62 toward the controller 12. The outer radius of the second annular protrusion 57 when the second annular protrusion 57 is separate from the fit region 62 is greater than the inner radius of the fit region 62. Therefore, even when the cylindrical portion 52 of the sealing member 51 is biased to move toward the coil 25, the cylindrical portion 52 is regulated from moving due to interference between the second annular protrusion 57 and the edge portion of the fit region 62.

The sealing member 51 can be coupled to the housing 23 by inserting the protrusions 53 into the lead holes 38. Thus, assembling process of the sealing member 51 can be easily automated.

The sealing member 51 includes the plurality of protrusions 53 and each protrusion 53 is connected to each other through the base 52. Thus, there is no need to have a plurality of sealing member for the plurality of lead holes 38.

In the first embodiment, the distance A between the second annular protrusion 57 and the end surface 63 of the sealing member 51 close to the coil 25 is greater than the distance B between the end surface of the coil 25 close to the lead hole 38 and the end portion 64 of the fit region 62 close to the coil 25.

Figure 5:
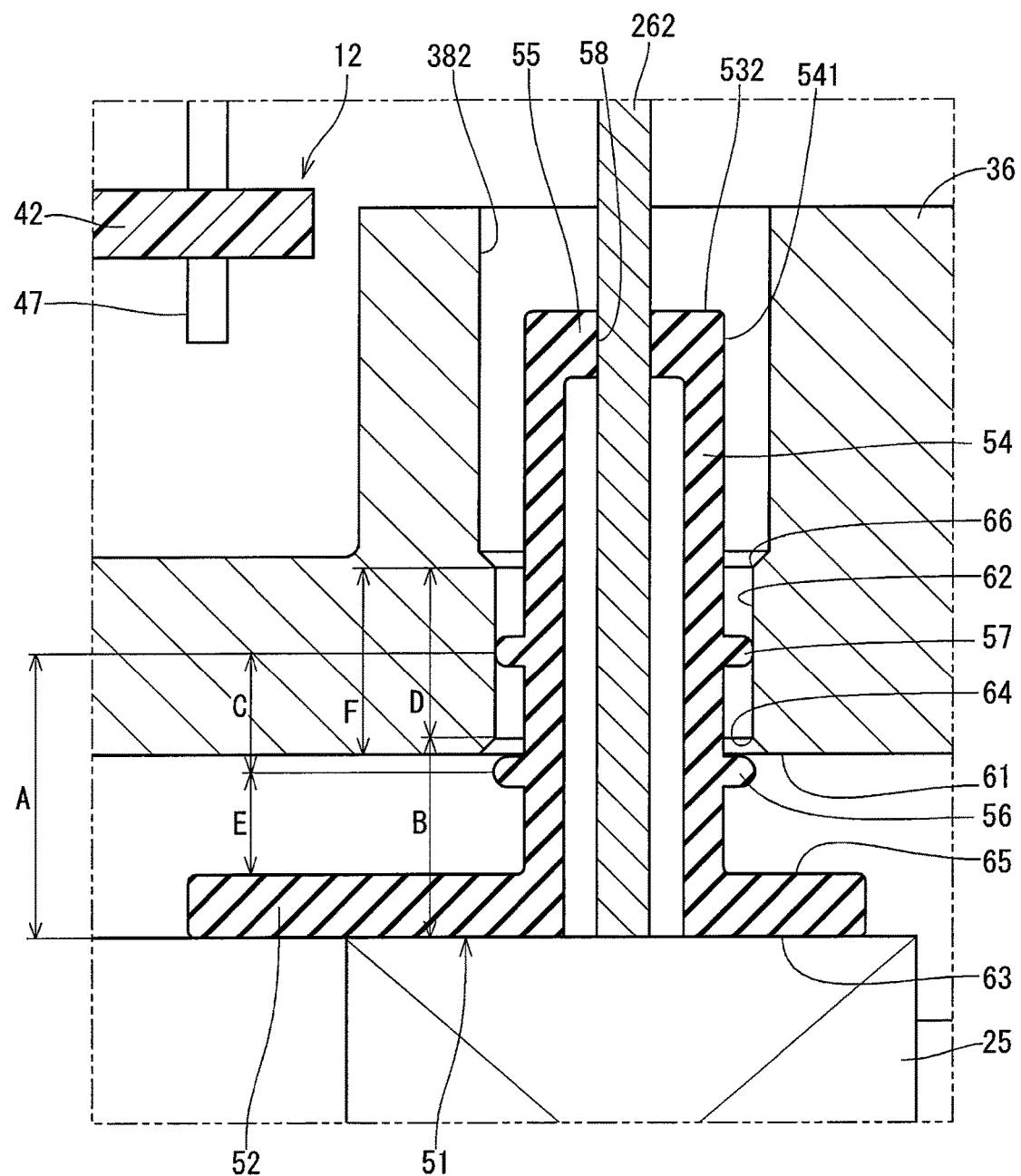
FIG. 5 is a diagram illustrating the sealing member at a maximum position toward the coil from the state shown in FIG. 4.
Figure 6:
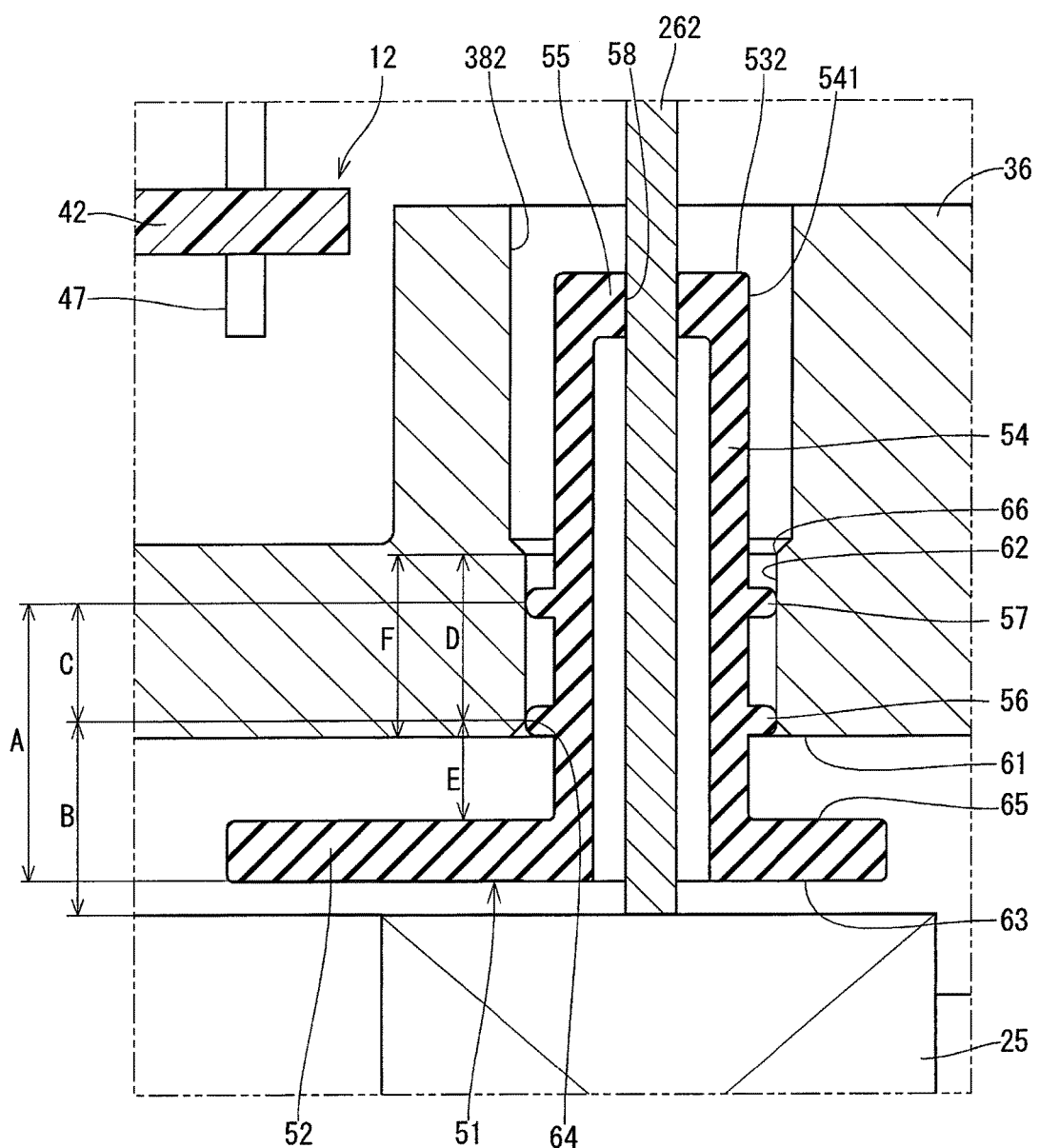
FIG. 6 is a diagram illustrating the sealing member at a position where the first annular protrusion that is about to be removed from the fit region from the state shown in FIG. 4.

Accordingly, even when the sealing member 51 moves toward the coil 25, the protrusions 53 can be prevented from being removed from the lead holes 38 due to interference of the sealing member 51 against the coil 25 as shown in FIG. 5. Further, the second annular protrusion 57 is maintained in the compressed state, and therefore the lead holes 38 can be maintained in the closed state.

Further, the distance C between the first annular protrusion 56 and the second annular protrusion 57 is less than the length D of the fit region 62 along the insertion direction.

Accordingly, when the sealing member 51 moves toward the coil 25 and the first annular protrusion 56 is biased to be removed from the fit region 62, the second annular protrusion 57 has been fit in the fit region 62. Therefore, even when the first annular protrusion 56 is removed from the fit region 62, the second annular protrusion 57 is maintained in the compressed state, whereby the lead holes 38 can be maintained in the closed state.

In the first embodiment, the distance E between the end surface 65 of the base 52 close to the lead hole 38 and the first annular protrusion 56 is less than the distance F between the edge portion 61 of the lead hole 38 close to the coil 25 and the end portion 66 of the fit region 62 close to the controller 12.

Therefore, even when the sealing member 51 is press-fit into the lead holes 38 until the base 52 is brought into contact with the edge portion 61, the first annular protrusion 56 is maintained in the compressed state, and therefore the lead holes 38 can be maintained in the closed state.

In the present embodiment, the gap is formed between the lead 26 and the portion of the cylindrical portion 54 radially inward of the first annular protrusion 56 and the second annular protrusion 57.

Therefore, when assembling, since the first annular protrusion 56 and the second annular protrusion 57 are greater than the inner radius of the fit region 62, the protrusions 56, 57 are in tightly contact with the inner wall of the fit region 62. At this moment, the first and second annular protrusions 56, 57 are easily deformed because of the existence of the gap between the inner wall of the cylindrical portion 54 and the lead 26, and therefore the protrusions 56, 57 can be easily inserted into the lead hole 38.

In the first embodiment, the gap is formed between the through hole outer wall 541 and the inner wall of the lead hole 38.

Thus, when assembling, although the outer radius of the through hole outer wall 541 slightly enlarges when the lead 26 is fit into the through hole 58, the cylindrical portion 54 can be easily inserted into the lead hole 38 because of the existence of the gap between the through hole outer wall 541 and the inner wall of the lead hole 38.

Second Embodiment

Figure 7:
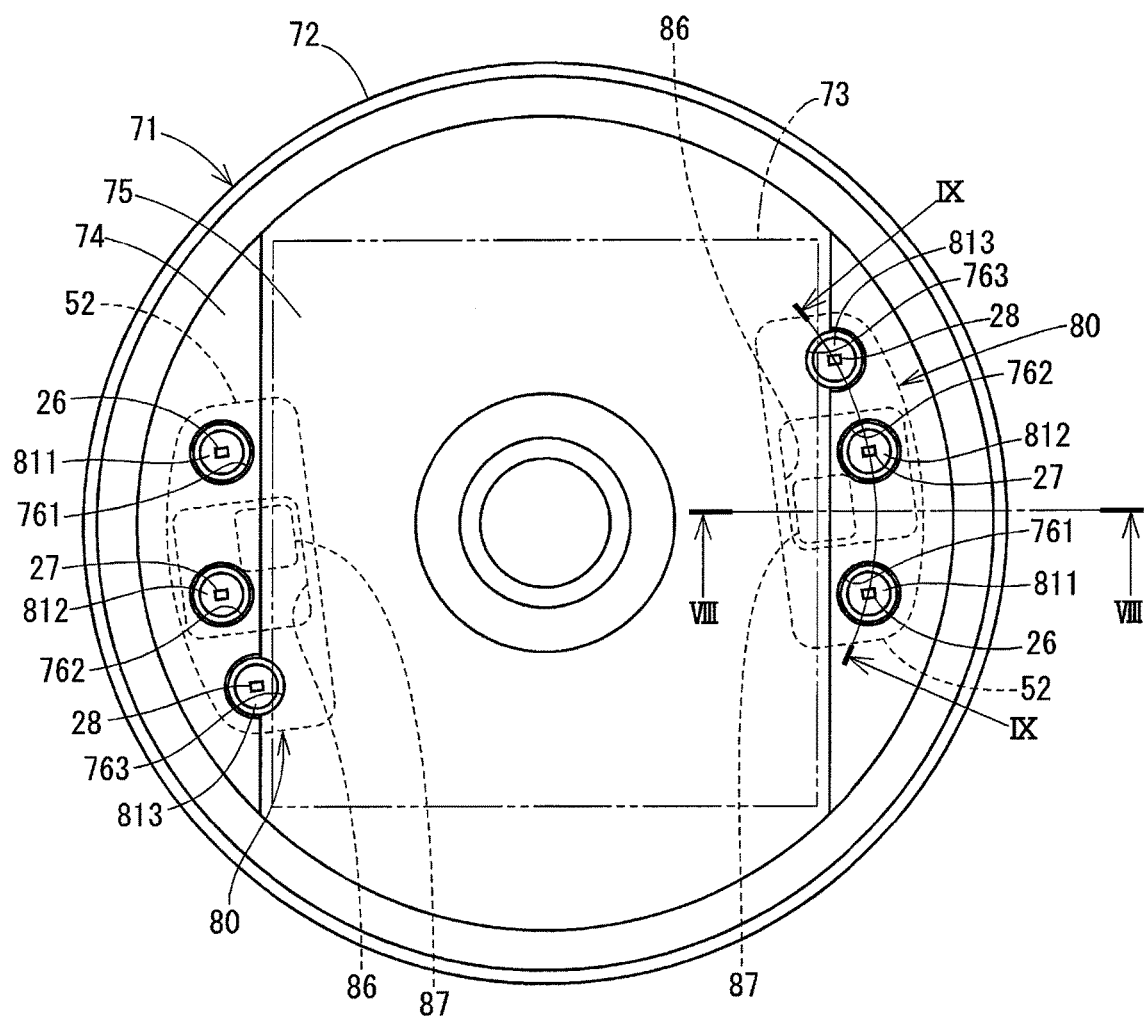
FIG. 7 is a diagram illustrating a motor of a driving device and a sealing member when viewed in the axial direction according to a second embodiment.
Figure 8:
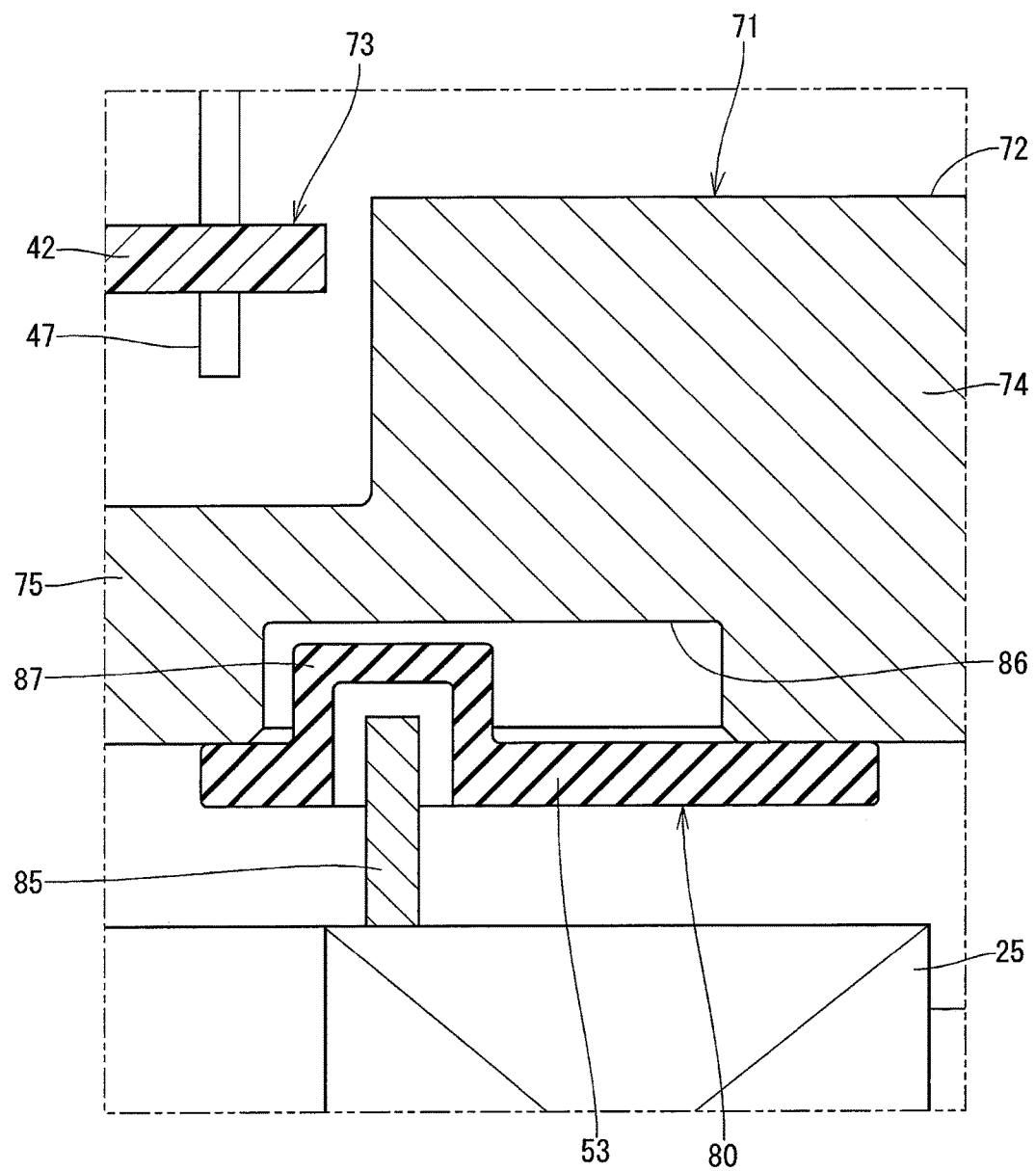
FIG. 8 is a cross-sectional view taken along VIII-VIII line in FIG. 7.
Figure 9:
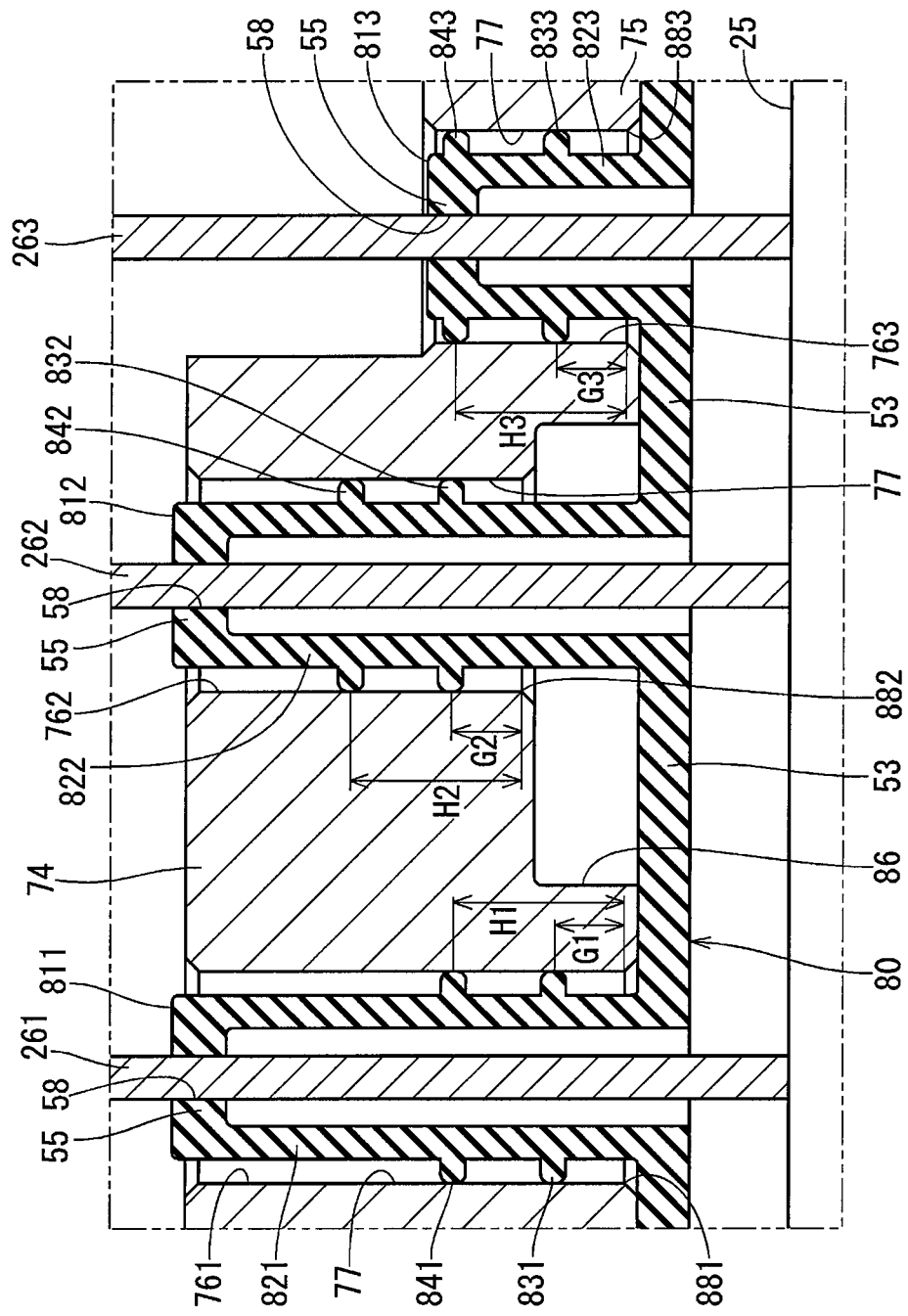
FIG. 9 is a cross-sectional view taken along IX-IX line in FIG. 7.

With reference to FIGS. 7 to 9, the first frame end 72 of the housing 71 according to the second embodiment includes a thicker portion 74, which is not overlapped with the controller 73 when viewed in the axial direction, a thinner portion 75, which is overlapped with the controller 73 when viewed in the axial direction. The thinner portion 75 is formed to a thinner shape not to interfere with the controller 73. The lead holes 761, 762 are formed in the thicker portion 74. The lead hole 763 is formed over the thicker portion 74 and the thinner portion 75. Hereinafter, the lead holes 761, 762, 763 may be referred to as "lead holes 76" when not distinguishably referred. The lead hole 76 has chamfered portions formed in both ends. The portion of the lead hole 76 other than the chamfered portion serves as the fit region 77.

The sealing member 80 includes the protrusions 811, 812, 813. The protrusion 811 includes the cylindrical portion 821, the cover portion 55, the first annular portion 831, and the second annular portion 841. The protrusion 812 includes the cylindrical portion 822, the cover portion 55, the first annular portion 832, and the second annular portion 842. The protrusion 813 includes the cylindrical portion 823, the cover portion 55, the first annular portion 833, and the second annular portion 843. The cylindrical portion 823 for the lead hole 763 is formed to be shorter than the others 821, 822. The first annular protrusions 831, 832, 833 and the second protrusions 841, 842, 843 are fit in the fit regions 77 in the compressed state.

A neutral point connection 85 of a Y-connection is disposed in the end surface of the coil 25 close to the lead hole 38. The first frame end 72 includes a recessed portion 86 to face the neutral point connection 85 when viewed in the axial direction. The sealing member 80 includes a cover 87 formed to be recessed from the base 52 toward the recessed portion 86. The cover 87 is disposed between the neutral point connection 85 and the first frame end 72.

The lead hole 762 passes through the recessed portion 86 and corresponds to a "particular hole". The fit region 77 for the lead hole 762 includes an end portion 882 (a particular end portion) close to the coil 25. The end portion 882 is offset toward the controller 73 in the axial direction as compared to end portions 881, 883 of the other fit regions 77 close to the coil 25. Further, the second annular protrusion 842 of the sealing member 80 is offset toward the controller 73 in the axial direction as compared to the second annular protrusions 841, 843. Likewise, the first annular protrusions 831, 832, 833 of the sealing member 80 have a similar positional relationship.

Here, "a distance between the end portion of the fit region close to the coil and the first annular protrusion" is defined as a first insertion distance. Further, "a distance between the end portion of the fit region close to the coil and the second annular protrusion" is defined as a second insertion distance. The first annular protrusions 831, 832, 833 are formed such that the first insertion distance G1 for the first annular protrusion 831, the first insertion distance G2 for the first annular protrusion 832, and the first insertion distance G3 for the first annular protrusion 833 are equal to each other regardless of the positions of the edge portions 881, 882, 883 of the fit regions 77 that are relatively offset from each other in the axial direction. Similarly, the second annular protrusions 841, 842, 843 are formed such that the second insertion distance H1 for the second annular protrusion 841, the second insertion distance H2 for the second annular protrusion 842, and the second insertion distance H3 for the second annular protrusion 843 are equal to each other regardless of the positions of the edge portions 881, 882, 883 of the fit regions 77 that are relatively offset from each other in the axial direction.

As described above, since the first annular protrusion 83 is fit into the fit region 77 in the compressed state, the second embodiment can achieve the similar effects as the first embodiment.

Further, the first insertion distances G1, G2, G3 are equal to each other in the second embodiment, and the second insertion distances H1, H2, H3 are equal to each other in the second embodiment. Therefore, in a case where the protrusions 811, 812, 813 are inserted into the lead holes 76 when assembling the sealing member 80, friction resistance by the annular protrusions can be equalized. As a result, the cylindrical portions 821, 822, 823 can be equally inserted into the lead holes 76, and therefore it is possible to suppress the sealing member 80 to be inclined during the insertion.

Other Embodiments

In the above embodiments, one second annular protrusion is provided for each protrusion. However, a plurality of second annular protrusions may be used for each of the protrusions. In this case, the plurality of second annular protrusions includes a particular second annular protrusion that is closest to the controller among the plurality of second annular protrusions. The distance C is defined as a distance between the particular second annular protrusion and the first annular protrusion.

The controller may be formed of a driving circuit to switch energizing to the motor without the microcomputer.

The electronic components forming the controller such as switching elements may be mounted on one substrate. In other words, the number of the substrate included in the controller may be one.

The lead extending from the coil may be connected to the substrate of the controller.

The heat sink in the controller may be eliminated. The first frame end may serve as the heat sink.

The motor may have a single phase coil or 4 or more phase coil instead of three-phase coil.

Only one sealing member may be used for the plurality of leads extending from the pair of three-phase coils.

The lead hole of the first frame end and the through hole of the cover portion of the sealing member may have a cross-sectional shape other than the circle.

The end of the lead hole of the first end frame may not be chamfered. Entire inner wall of the lead hole may serve as the fit region.

The positons of the fit regions of the plurality of lead holes are offset from each other in the axial direction.

Two or more second annular protrusions of the sealing member may be provided for the respective cylindrical portion.

The protrusion of the sealing member may not protrude from the lead hole of the first frame end toward the controller.

The base of the sealing member may be coupled to be separate from the first frame end.

The connection of the coil may be a connection other than a Y-connection.

The driving device may be applied to a device other than the electric power steering device.

What is claimed is:

1. A driving device comprising:
   a stator that includes a coil having a plurality of leads;
   a rotor that is disposed to be rotatable relative to the stator;
   a housing that houses the stator and the rotor and defines a plurality of lead holes into which the plurality of leads are inserted;
   a controller that is disposed outside of the housing, the plurality of leads being connected to the controller; and
   a sealing member that includes a base, which is disposed in the housing between the plurality of lead holes and the coil, and a plurality of protrusions, which protrude from the base into the plurality of lead holes, the plurality of leads being inserted into the plurality of protrusions, wherein
   each of the plurality of protrusions includes a cylindrical portion, a cover portion, a first annular protrusion, and a second annular protrusion,
   the cover portion is disposed to cover an end of the cylindrical portion opposite to the base and to be in tightly contact with one of the plurality of leads,
   the first annular protrusion outwardly protrudes from the cylindrical portion between the base and the cover portion,
   the second annular protrusion outwardly protrudes from the cylindrical portion between the first annular protrusion and the cover portion,
   a region of each of the plurality of lead holes is defined as a fit region in which the first annular protrusion and the second annular protrusion are able to fit in a compressed state,
   the first annular protrusion is fit in the fit region in the compressed state,
   the second annular protrusion is offset from the fit region toward the controller or is fit in the fit region in the compressed state,
   a distance between an end portion of the fit region close to the coil and the first annular protrusion is defined as a first insertion distance,
   a distance between the end portion of the fit region close to the coil and the second annular protrusion is defined as a second insertion distance,
   the first insertion distance for the cylindrical portion of each of the plurality of protrusions is equal to each other even when the fit region of each of the lead holes is offset from each other in an axial direction, and
   the second insertion distance for the cylindrical portion of each of the plurality of protrusions is equal to each other even when the fit region of each of the lead holes is offset from each other in the axial direction.

2. The driving device according to claim 1, wherein
   a distance between an end surface of the sealing member close to the coil and the second annular protrusion is greater than a distance between an end surface of the coil close to the plurality of lead holes and an end portion of the fit region close to the coil.

3. The driving device according to claim 1, wherein
   the second annular protrusion is one of a plurality of second annular protrusions,
   the plurality of second annular protrusions includes a particular second annular protrusion that is closest to the controller among the plurality of second annular protrusions,
   a distance between the particular second annular protrusion and the first annular protrusion is less than a length of the fit region.

4. The driving device according to claim 1, wherein
   a distance between an end surface of the base close to the plurality of lead holes and the first annular protrusion is less than a distance between an edge portion of each of the plurality of lead holes close to the coil and an end portion of the fit region close to the controller.

5. The driving device according to claim 1, wherein a neutral point connection of a Y-connection is disposed in an end surface of the coil close to the plurality of lead holes, a recessed portion is formed in the housing at a position corresponding to the neutral point connection, the plurality of lead holes includes a particular hole that passes through a bottom of the recessed portion, the fit region for the particular hole includes a particular end portion close to the coil, and the particular end portion is offset from the end portion of the fit region for each of the plurality of lead holes other than the particular hole toward the controller in the axial direction.

6. The driving device according to claim 1, wherein a gap is formed between each of the plurality of leads and a portion of the cylindrical portion radially inward of the first annular protrusion and the second annular protrusion, and a gap is formed between an inner wall of each of the plurality of lead holes and a portion of the cylindrical portion radially outward of the cover portion.

7. A driving device comprising:

a stator that includes a coil having a plurality of leads;

a rotor that is disposed to be rotatable relative to the stator;

a housing that houses the stator and the rotor and defines a plurality of lead holes into which the plurality of leads are inserted;

a controller that is disposed outside of the housing, the plurality of leads being connected to the controller; and a sealing member that includes a base, which is disposed in the housing between the plurality of lead holes and the coil, and a plurality of protrusions, which protrude from the base into the plurality of lead holes, the plurality of leads being inserted into the plurality of protrusions, wherein each of the plurality of protrusions includes a cylindrical portion, a cover portion, a first annular protrusion, and a second annular protrusion, the cover portion is disposed to cover an end of the cylindrical portion opposite to the base and to be in tightly contact with one of the plurality of leads, the first annular protrusion outwardly protrudes from the cylindrical portion between the base and the cover portion, the second annular protrusion outwardly protrudes from the cylindrical portion between the first annular protrusion and the cover portion, each of the plurality of lead holes includes a fit region and a remaining region, the fit region having an inner radius that is less than an inner radius of the remaining region, an outer radius of the first annular protrusion, and an outer radius of the second annular protrusion, the first annular protrusion is fit into the fit region and located adjacent to the coil, and the second annular protrusion is located in the remaining region offset from the fit region toward the controller.

\* \* \* \* \*